July 11, 1939.   C. O. CHRISTIANSON   2,165,959
DRINK VENDING MACHINE
Filed May 24, 1937   5 Sheets-Sheet 1
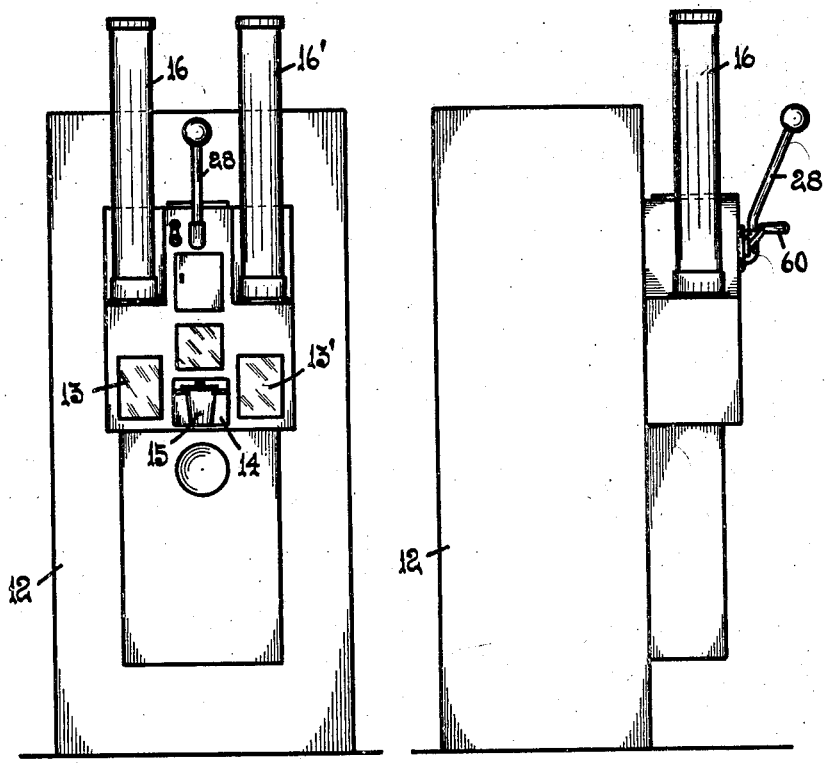
Inventor
By C. O. Christianson.
Hiram A. Sturges   Attorney

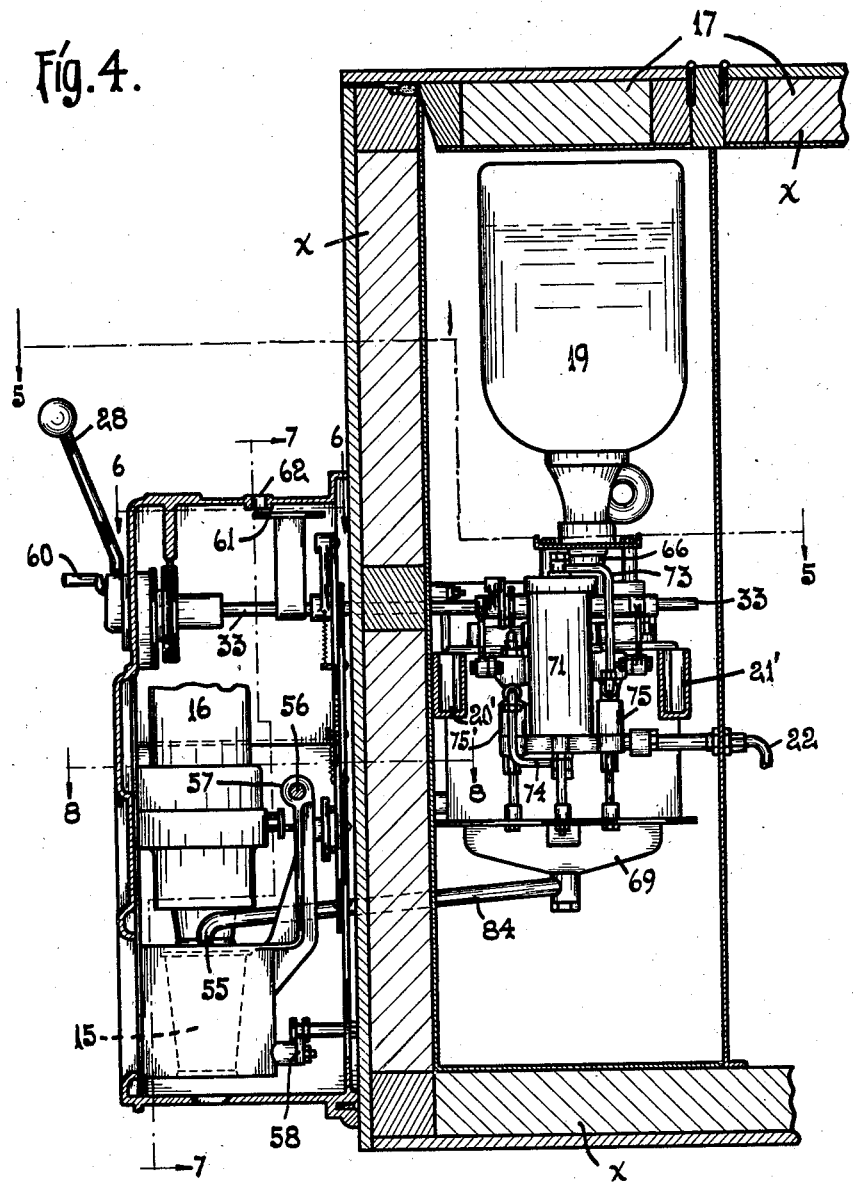

July 11, 1939.  C. O. CHRISTIANSON  2,165,959
DRINK VENDING MACHINE
Filed May 24, 1937   5 Sheets-Sheet 3

Inventor
By C.O.Christianson.
Hiram A. Sturges  Attorney

Inventor
C. O. Christianson.
Hiram A. Sturges Attorney

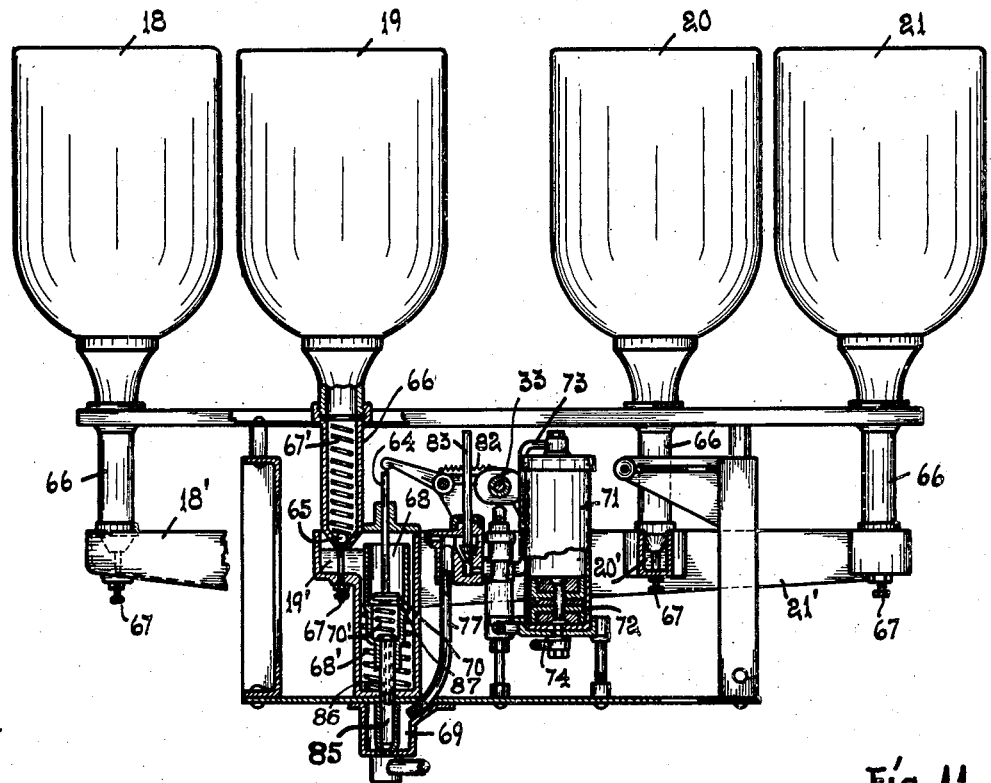

Patented July 11, 1939

2,165,959

UNITED STATES PATENT OFFICE 2,165,959

DRINK VENDING MACHINE

Carl O. Christianson, Ames, Iowa

Application May 24, 1937, Serial No. 144,405

10 Claims. (Cl. 225—21)

This invention relates to a machine for vending beverages automatically, and more particularly for vending selected drinks, and has for its object, broadly, to provide a liquid dispenser of such construction that it will require no attention except to keep it supplied with liquids, flavoring syrups and paper cups or other drinking-receptacles, these machines being for installation in public places generally, so that any person, after depositing a coin as a purchase price, will receive the selected drink.

The invention includes an index-member bearing a plurality of names of beverages, so that a patron may select and obtain any designated drink, and includes mechanism of such few and simple parts that the machine may be conveniently operated and may be economically manufactured.

The invention consists of the new and useful construction, combination and arrangement of parts as described herein and claimed, and as shown in the drawings, it being understood that the drawings illustrate only one embodiment of the invention, and that changes may be made in size, form, proportions and minor details, said changes being within the scope of the invention as claimed.

In the accompanying drawings, Fig. 1 is a view of the machine in front elevation. Fig. 2 is a side view of the machine, and Fig. 3 is a top plan view of the same.

Fig. 4 is a vertical section on line 4—4 of Fig. 5, a syrup-receptacle being added and the cup-cylinders being omitted.

Fig. 9 is a vertical section on line 9—9 of Fig. 5, a plurality of syrup-receptacles being added.

Fig. 10 is a sectional view on an enlarged scale relating to Fig. 9.

Fig. 11 is an enlarged detail relating to the coin control.

Figure 5:
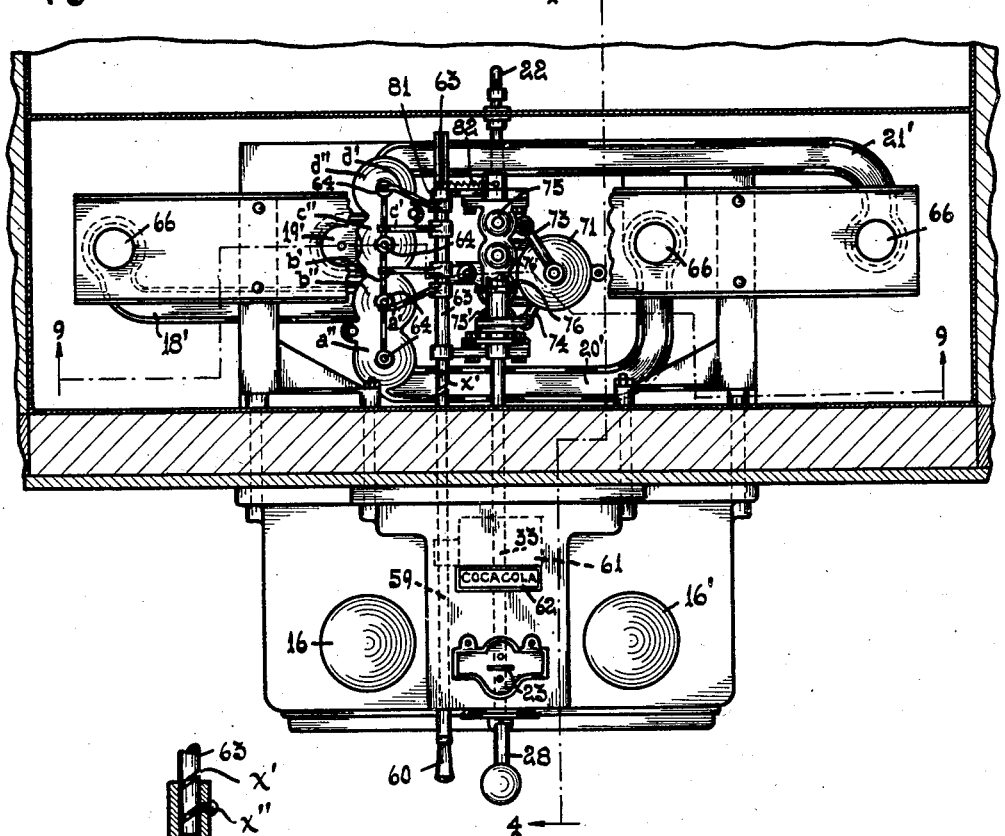
Fig. 5 is a transverse section on line 5—5 of Fig. 4, a pair of cup-cylinders being added.

Referring now to the drawings for a more particular description, the invention is illustrated and described in connection with a cabinet 12 provided at its front with a pair of glass windows 13 and 13' best shown in Fig. 1, and an intermediate open space 14 for delivering a beverage, together with a pair of cup-holding cylinders 16 and 16', each cylinder being disposed in the vertical plane of a window.

Any suitable means may be provided for maintaining the contents of the casing at a low degree of temperature, and as shown at x in the drawings, the walls of the casing are provided with insulation, and preferably, the top of the cabinet is provided with swingable doors 17 (Fig. 4) to permit access to interior parts. Below the doors are indicated jars or receptacles 18, 19, 20 and 21 for containing a variety of flavoring syrups, and at 22 (Fig. 4) is indicated an intake pipe for carbonated water or other liquids under compression.

Since no claim is made for a coin-control in the present application, no description thereof is necessary except to state that if a coin is deposited in the slot 23 (Figs. 3, 5), it will slide downwardly between the pair of discs 25 and will rest upon a small disc 26 which is provided with a finger 27.

Numeral 28 indicates a crank or swingable hand lever of a horizontal operating shaft 33, and when this shaft is rotated the coin will be moved by movement of the finger 27 and will engage a contact-pin 29 which is eccentrically mounted on a swingable hook-lever 30, the pivotal mounting of the latter being indicated at 31. The hook-lever is provided with a finger 32 which engages and slides upon the operating shaft 33.

The hook for this lever 30 is indicated at 34, and it is adapted to engage a pin 35 to prevent rotation of the operating shaft 33 if no coin has been inserted. Operation of shaft 33, after a coin has been inserted, causes the hook-lever to swing since the coin will then be in engagement with the pin 29, and the hook-lever 30 will cause disengagement of the hook 34 from the pin 35, and the coin will move down to a cash box (not shown).

The hand-lever for shaft 33 is limited in its swinging movements by means of a stationary stop-pin 36 when engaged by a lug 37 of a disc 25.

The rotation of shaft 33 as described, will be in a "clockwise" direction in an arc, approximately, of 90 degrees, and will cause a horizontal sliding movement of a cup-frame 38, said cup-frame being provided with a pair of compartments 39 and 39'.

It will be understood that the compartments 39 and 39' are for the purpose of delivering the beverage in a cup, and in operation, the cups drop into the compartments in alternation from the cup-cylinders 16 and 16'. In other words, at the time the beverage flows into the cup in one compartment the other compartment will contain an empty cup, and when the hand-lever 28 is performing its swinging movement as mentioned the empty cup will be moved to "filling" position and another cup will drop from a cup-cylinder into the empty compartment.

The reason why the cups 15 drop in alternation into the compartments 39 and 39' from the cup-cylinders 16 and 16' is because of an automatic control (not shown) which is well known and consists of a releasing device provided for the cup cylinders, the latter being a manufactured product purchased and used by applicant, the operation being that a movement of the lever 28 will cause release of a cup to permit it to drop.

The means for moving the cup-frame horizontally consist, in part, of a crank-arm 40 (Fig. 7) which is provided for the shaft 33 and is pivotally mounted on the pivotal coupling 41 which engages in the horizontal slot 41' of the vertical link 42, said link being under control, during its vertical movements, of stationary pivot-pins 43 which engage in vertical slots 44 of the link.

This link is provided with a pair of pivotally mounted lugs 45, the stationary pivots therefor being indicated at 46. Numerals 47 indicate a pair of stop-pins which limit the swinging movements of the lugs 45 in one direction. A spring 48' is used and is attached to these two lugs to normally cause said lugs to engage the stop-pins 47.

Numeral 48 indicates a cam arranged to rotate on a stationary pivot 49. It is provided on its face with four projections 50 disposed equi-distant from the pivot 49, each projection 50 being also equi-distant from a projection adjacent thereto.

Figure 7:
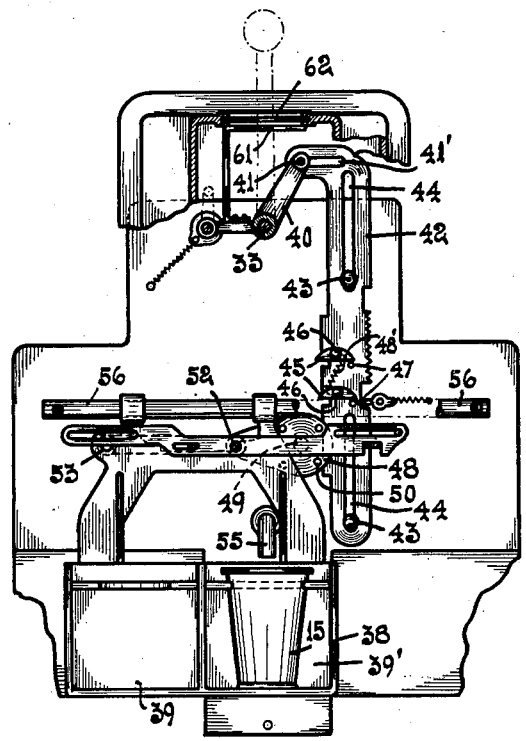
Fig. 7 is a vertical section on line 7—7 of Fig. 4.
Figure 8:
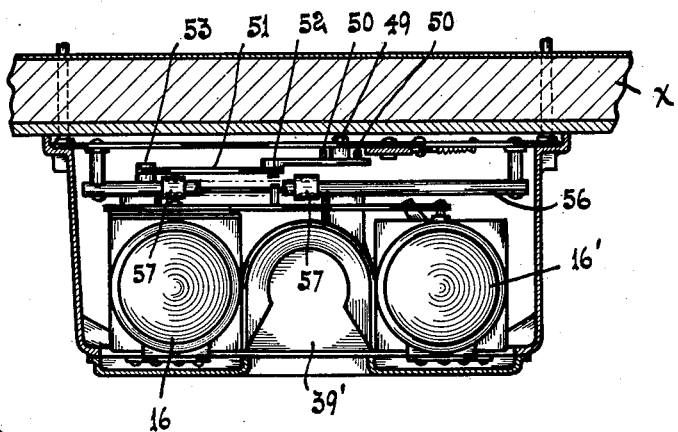
Fig. 8 is a transverse section on line 8—8 of Fig. 4.

As best shown in Figs. 7 and 8 a link 51 is employed, one end of which is pivoted, as indicated at 52, to the apex of the cam 48, the opposite end of this link having a pivotal mounting 53 to the cup-frame 38, the operation being that at each movement of the cam 48 in an arc of 180 degrees, the link 51 will be moved for moving the cup-frame in a horizontal direction to dispose the beverage cup at a point beneath the discharge nozzle 55, an empty cup at that time dropping into the other compartment.

The cup-frame is supported upon a horizontal slide-bar 56 which is secured to a wall of the cabinet, said cup-frame being provided with a pair of hangers 57 carried by the slide-bar, and any undue swinging movements of the cup-frame will be prevented by rollers 58.

As described, only one cup at one time will fall into a compartment 39 or 39' for the reason that when the hand-lever 28 is used it causes a movement of the cup-frame 38 (Figs. 7 and 8) for causing a movement of a single cup 15 into compartment 39'.

The function discharged by the four projections 50 is to cause rotatable movements of the cam 48 by action of the link 42. A movement of the hand-lever 28 causes a part rotation of the cam 48 for the reason that the link 42 will be moved vertically, said link being provided with lugs 45, as described, which engage the projections 50 in succession and causing rotatable movements of said cam for shifting the cup-frame 38 horizontally.

The means for selecting the desired beverage consists, in part, of a selector-shaft 59 adapted to be rotated by its crank 60. This shaft is threaded, and mounted thereon is an index-plate 61 (Figs. 5, 6), said index-plate bearing words indicating a variety of beverages shown at a, b, c and d (Fig. 6), a slot or window-member 62 being provided in the top of the cabinet, and when this shaft is rotated any one of the names selected of beverage a, b, c, or d may be disposed in view at the window-member.

The selector-shaft 59 operates in connection with a control-shaft 63 which is provided at intervals, transversely thereof, with a plurality of fingers, the number of fingers corresponding to the number of beverages, and indicated at a', b', c' and d'.

The shaft 63 is threaded at one of its ends as indicated at x' and these threads are engaged by a guide-pin x'' which is disposed in the tubular end-portion of the shaft 59, and in operation when the shaft 59 is rotated clockwise, the control-shaft 63 will move longitudinally into the tubular part of the shaft 59, said plate 61 also moving in the same direction as said control-shaft at this time.

In operation, the purchaser of a beverage may move the crank 60 in either direction to cause a corresponding rotation of the shaft 59 for causing the index-plate 61 to move until the name of the beverage a is visible at the slot or window 62, the control-shaft 63 also moving with its groove x' engaged by the guide-pin x'' (Fig. 6), and on account of the construction as described, the finger a' will be disposed in the vertical plane of the valve-stem 64 of a syrup-cylinder a'', so that, during operation, the purchaser will receive the beverage a, and the crank-arm 60 may be used repeatedly for selecting any designated beverage, and in all instances any one of the fingers a', b', c' or d' may be disposed above a valve stem 64 of a syrup cylinder corresponding to a selected beverage a, b, c, or d, the longitudinal movements of the control-shaft 63 being automatic in operation, for this purpose. The fingers a', b', c' and d' will be swung downwardly and pressed upon the valve stems 64 for dispensing the selected drinks, the operation being further described as follows: Since the cam 78 on shaft 33 is of elliptical form, the lever 81 (Fig. 10) which slides on the periphery of said cam, will be swung upwardly by action of the cam when shaft 33 is rotated, this upward movement of the lever causing a rotatable movement of shaft 63 for moving the fingers a', b', c', and d' downwardly, and thereby causing one of said fingers to be pressed downwardly upon a valve stem 64 corresponding to the selected drink. The spring 82 (Fig. 5) is for use in causing a reverse rotation of the shaft 63, one end of said spring being secured to the top of the lever 81 and its opposite end being secured to the shaft 33. When shaft 33 and its cam rotate approximately 90 degrees, that part of the periphery of the cam defining its greater diameter will engage and will move the lever 81 upwardly for the purpose mentioned.

It will be understood that while the shaft 59 is performing its rotatable movement for moving the shaft 63 longitudinally its limited distance the shaft 33 and its cam 78 remain idle. When the shaft 33 is rotated its cam causes actuation of the lever and shaft 63 as described. Action of the spring 82 will cause a reverse rotation of the shaft 63.

The four syrup jars shown in Fig. 9 are each in communication respectively with one of the syrup cylinders a'', b'', c'', or d'', each being under control of a check valve 65 disposed in a supply-cylinder 66, and suitable syrup-holders or conduits are used, indicated at 18', 19', 20' and 21', each conduit leading from a supply cylinder 66 to a syrup cylinder, the syrup cylinder for the conduit 19' being shown in section in Fig. 9. The check valves 65, as above stated, are used for the reason that some of the syrups may be heavier and may flow less readily than others, and these check valves may be adjusted in a well known manner so that the flow of syrups will be practically uniform.

Each beverage which may be selected must include a specific measured quantity of syrup, and each valve 65 of a supply-cylinder 66 which opens upon its syrup-jar to permit syrup to move thereto by gravity, is under control of a set-screw 67 for said valve 65, each set-screw being threaded in the bottom wall of a conduit and operating to maintain the valve in open position to permit the syrup to enter and to fill the conduit. Each valve 65 is normally pressed toward its seat by means of a spring 67'. The adjustments as described may provide for the suitable flow of syrup to the measuring cups 68, depending upon the consistency of syrups.

The conduits open upon the syrup-cylinders $a''$, $b''$, $c''$ and $d''$, each of the latter being provided with a measuring-cup 68 which is normally pressed upwardly by a master spring 68' so that its open top will be disposed above the level surface of the syrup in the conduit adjacent thereto.

As best shown in Fig. 9, a vertically disposed, stationary pipe 85 opens on the mixing-chamber 69 and is in communication with a vertically disposed stationary pipe 86. The lower open end-portion of each measuring cup is of reduced size and encircles a conducting-pipe 86, and during vertical reciprocation of each cup the lower open end thereof will slide on a pipe 86. The valve seat for each valve 70 is indicated at 87, and consists of a reduced part of the measuring cup as shown in said Fig. 9. Since the tubes 85 and 86 are open at their ends, it may be said that each measuring-cup is in communication with the mixing-chamber, subject to the control of valve 70.

The valves 70 of the valve-stems 64 are normally pressed upwardly from their valve-seats by springs 70'.

In operation, when a finger of the control-shaft 63 is moved downwardly the valve 70 will move to its seat 87 and the measuring cup 68 will then move downwardly against the force of the master spring 68' to a point below the surface of the syrup in the conduit and therefore will become filled with syrup.

When pressure on the finger ceases, the filled cup 68 by action of the master-spring 68' will dispose its upper open end above the surface of the syrup in the conduit, and thereafter the valve 70 will move to open position by action of the spring 70'.

It will thus be seen that the measuring cup 68 in each cylinder $a''$, $b''$, $c''$ and $d''$ is slidably mounted, and is under control of a movable finger, a master-spring and a minor spring. When pressed upwardly its valve 70 opens and the syrup enters the mixing receptacle 69.

The intake 22 for carbonated water leads to a water-measuring tank 71 (Fig. 9) which operates as a double-action pump driven by pressure of the water and is provided with a piston 72.

The upper end of the tank 71 is provided with a conducting pipe 73 and the lower end is provided with a conducting pipe 74.

These conducting pipes are used in alternation and each is used as an inlet and an outlet for the tank to effect reciprocation of the piston by pressure of the water.

The water from the intake 22 enters a valve housing 75 which contains an intake check valve, and the water is conducted to the tank through the conducting pipe 73.

The intake water pipe 22 is also in communication with an intake valve housing 75'.

Numeral 76 indicates an outlet valve housing having a conducting pipe 77 leading to the mixing receptacle 69. The valve housing 75' which communicates with the intake 22 also communicates with the tank 71 through the pipe 74.

An outlet valve housing 76' is in communication with the mixing chamber 69 through the pipe 77 and also is in communication with the tank 71 through the conducting pipe 73.

When the piston is disposed in its uppermost position in the tank 71 the lower part of the tank will be filled with water, and if, at this time, the outlet valve of the housing 76 is opened, the water will move to the mixing-receptacle 69 through the pipe 74, valve-housing 76 and discharge pipe 77, and coincidently, water under pressure will enter the upper part of the tank through the conducting pipe 73, from the valve housing 75 and pipe 22, and in operation, the piston 72 will be moved in alternation to cause a discharge of the carbonated water to the mixing receptacle.

As best shown in Fig. 10, the shaft 33 is provided with eccentrically formed cams 78, each cam being in engagement with a valve-stem 79 of the valves 80 of the valve housings 76 and 76' above mentioned, and it will be understood that the parts are of suitable proportions so that timings will be provided for operation of the valves in the four valve housings above described, the valve-stems 79 being moved by the eccentrically formed cams.

Figure 6:
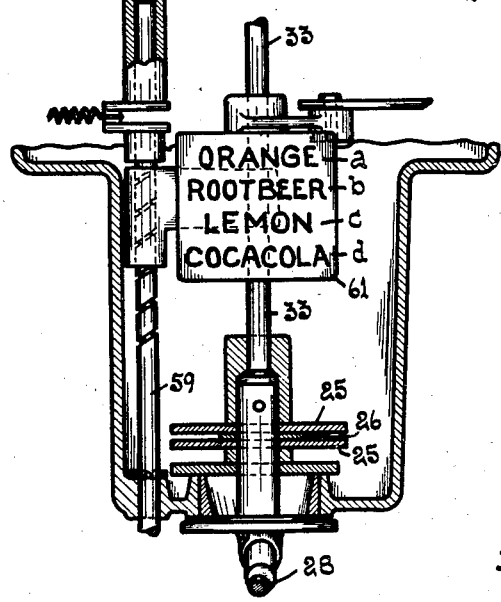
Fig. 6 is a transverse section on line 6—6 of Fig. 4.

As shown in Figs. 5 and 10, the shaft 63 is provided with a contact-arm 81 which engages a cam 78 on shaft 33 for the purpose of moving the fingers $a'$, $b'$, $c'$, and $d'$, downwardly, said fingers being moved upwardly by action of a spring 82.

By referring to Fig. 5 of the drawings it may be seen that the end-portion of the axially movable shaft 63 is provided with a slot in its upper side. The arm 81 at its enlarged end is provided with a lug (not shown) which engages in said slot, and therefore when shaft 63 has an axial movement to cause actuation of a selected valve, the arm 81 will ride on said shaft, said arm at all times being under control of the cam 78 of shaft 33.

Numeral 83 indicates a check valve for use in releasing any gas which might be generated by the carbonated water.

Numeral 84 indicates a conduit leading from the mixing-chamber 69 to the delivery nozzle 55 at the front of the machine.

I claim as my invention:

1. In a drink vending machine, a mixing receptacle, mechanism including a pair of normally seated outlet valves for controlling a movement of a measured liquid under pressure to the mixing receptacle, mechanism including a measuring-cup for controlling a movement of syrup to said mixing receptacle, a control-shaft provided with contact-members, means for moving the control-shaft longitudinally to dispose one of its contact-members in operative proximity to the measuring-cup, and an operating shaft connected with the control-shaft and adapted to be rotated to cause coincident unseating of the outlet valves to permit a movement of said liquid to the mixing receptacle and rotation of the control-shaft to cause actuation of the measuring-cup for a movement of syrup to said mixing receptacle.

2. In a drink vending machine, a mixing receptacle, a selector-shaft, an indicator-plate bearing names of beverages and having a threaded mounting on the selector-shaft, mechanism including a plurality of syrup-measuring cups for controlling movements of syrups corresponding to the names of beverages on said indicator-plate, a control-shaft having a threaded connection with the selector-shaft and provided transversely with contact-members, said selector-shaft being rotatable for coincident movements of the indicator-plate and longitudinal movement of the control-shaft to dispose one of its contact-members in operative proximity to a syrup-measuring-cup, and an operating-shaft connected with and adapted to be rotated to cause rotation of said control-shaft for actuation of a measuring-cup to permit a movement of syrup therefrom to said mixing-receptacle.

3. In a drink vending machine, a mixing receptacle, mechanism for controlling a liquid under pressure including a measuring-tank provided with a piston and pair of normally seated outlet-valves, mechanism including a plurality of syrup measuring-cups for measuring and controlling the movements of syrup, a control-shaft provided at intervals with transversely disposed contact-members and arranged for longitudinal adjustments to dispose one of its contact-members in operative proximity to a selected syrup measuring-cup, and an operating-shaft connected with the control-shaft and adapted to be rotated to cause coincident unseating of the outlet valves to permit said liquid to move to the mixing receptacle and rotation of the control-shaft for actuation of the selected syrup-measuring-cup to permit a movement of syrup therefrom to said mixing receptacle.

4. In a drink vending machine, a plurality of syrup cylinders, a mixing receptacle, a plurality of measuring-cups each provided with a valve seat and valve therefor and slidably mounted in a syrup cylinder and arranged to communicate with the mixing receptacle, a plurality of conduits for supplying the cylinders with syrups, spring normally disengaging said valves from their seats, springs normally moving the measuring-cups to unfilled position above the syrups, a pair of housings provided with inlet valves, a pair of housings in communication with the mixing receptacle and provided with outlet valves, a tank provided with a piston and pair of conducting pipes in communication with the housings of each pair, a conducting pipe for a liquid under pressure in communication with the housings of the intake valves, a control-shaft, an operating-shaft, co-operating devices on said shafts and outlet valves of said housings whereby a rotation of the operating-shaft in one direction may cause actuation of the control-shaft for moving the valve of a measuring-cup to its seat and moving said measuring-cup to filling position, the outlet valves of said housings moving to open position, and a rotation of said operating-shaft in a reverse direction may cause actuation of the control-shaft to permit the valve of the measuring-cup to move from its seat, the outlet valves of said housings moving to closed position.

5. In a drink vending machine, a cabinet provided with a slot, a threaded selector-shaft extending into the cabinet, an indicator-plate disposed below said slot carried by the selector-shaft and bearing names of beverages, a plurality of syrup-cylinders containing syrup-measuring-cups for beverages corresponding to the names of beverages on said indicator-plate, a control-shaft provided with contact-fingers and having a threaded connection with the selector-shaft, said last named shaft being rotatable for coincidently moving the indicator-plate to dispose the name of a selected beverage in register with said slot and for moving the control-shaft longitudinally to dispose one of its contact-fingers in register with a syrup-cylinder of a beverage corresponding to the registration of the selected name of the indicator-plate with said slot.

6. In a drink vending machine, a mixing receptacle, a plurality of syrup cylinders, syrup-jars each having a conduit leading to a syrup cylinder, spring controlled measuring-cups each slidably mounted in a syrup cylinder arranged to communicate with the mixing receptacle and provided with a valve seat, spring-controlled valves for said valve-seats each having a stem projecting outwardly of a syrup cylinder, a pair of valve housings arranged for communications with the mixing-receptacle and provided with outlet valves, a pair of valve housings each provided with inlet valves, a cylindrical tank provided with a piston, conducting pipes opening on the valve-housings and leading to said tank, a pipe for conducting liquid under pressure to said intake valve housings, a control-shaft provided with contact fingers and arranged for longitudinal adjustments for disposing a selected finger in line with an upwardly projecting valve-stem, an operating shaft, and co-operating means on the operating shaft, the valves of the outlet valve-housings and said control-shaft whereby a rotation in one direction of the operating-shaft may actuate the control-shaft for moving the valve of the measuring-cup to its seat and moving said measuring-cup to filling position, the outlet valves of the valve housings moving to open position, a rotation of said operating-shaft in a reverse direction causing actuation of the control-shaft to permit the valve of the measuring-cup to move from its seat, the outlet valves of said valve housings moving to their seats.

7. In a drink vending machine, a mixing receptacle, a pair of outlet valve housings in communication with the mixing receptacle and provided with valves, mechanism including a pair of inlet valve housings provided with valves, a cylindrical tank provided with a piston, an intake pipe for conducting a liquid under pressure to said inlet valve housings, and conducting pipes leading from the cylindrical tank to the outlet valve housings and inlet valve housings, a plurality of syrup cylinders arranged to receive syrups, a plurality of syrup measuring-cups each provided with a valve seat and valve therefor and arranged to communicate with the mixing receptacle, a longitudinally adjustable control-shaft provided with contact-fingers, a rotatable operating-shaft, co-operating devices for the operating shaft, control-shaft and outlet valve housings whereby the rotation of said operating-shaft may cause coincident actuation of the control-shaft and valves of the outlet valve housings to permit movements of syrup and said liquid to the mixing receptacle.

8. In a drink vending machine, a cabinet provided with a slot, an indicator-plate beneath the slot bearing names of beverages, a selector-shaft engaged by the indicator-plate and rotatable at will for moving said plate to cause a selected name thereof to appear in register with the slot, a mixing receptacle, a plurality of syrup cylinders adapted to receive syrups corresponding to the names on said indicator-plate, spring-controlled syrup-cups each slidably mounted in a syrup cylinder and leading to the mixing receptacle and provided with a valve seat and a spring-controlled valve therefor, a control-shaft provided with contact-fingers and mounted on the selector-shaft and arranged for longitudinal adjustments by the rotation of said selector-shaft to dispose one of its contact-fingers in the vertical plane of one of the syrup-measuring-cups, an operating-shaft connected with the control-shaft and adapted to be rotated to cause actuation of the last-named syrup-measuring-cup, a cylindrical tank for receiving a liquid under pressure and provided with a piston, and mechanism connected with said tank and actuated by the rotatable operating-shaft for conducting a measured part of said liquid to the mixing receptacle.

9. In a drink vending machine, a cabinet provided with a slot, a selector-shaft extending into the cabinet, an indicator-plate threaded on the selector-shaft and bearing names of beverages, a plurality of syrup cylinders having conduits for conducting syrups thereto corresponding to the names on the indicator-plate, a mixing receptacle, means including movable measuring-cups in the cylinders for delivering syrups to the mixing receptacle, a tank provided with a piston and arranged to receive a liquid under pressure, a pair of valve-housings communicating with the tank and provided with intake valves, a pair of valve housings communicating with the tank and with the mixing receptacle and provided with outlet valves, a control-shaft extensibly mounted on the selector-shaft and provided with contact-members, said selector-shaft being rotatable for coincidently moving the indicator-plate for disposing the name of a selected beverage in register with the slot of the cabinet and to move the control-shaft for disposing a contact-member thereof in line with a syrup cylinder and measuring-cup, a rotatable operating-shaft having a pivotal connection with the control-shaft, and co-operating devices on the operating-shaft normally engaging said outlet valves, whereby the rotation of said operating-shaft may cause rotation of the control-shaft for moving the measuring-cup, said outlet valves being released to permit coincident movements of syrup and water to the mixing receptacle.

10. In a drink vending machine, a cup-supporting frame, a mixing-receptacle having a conduit leading to said frame, a rotatable selector-shaft, means for selecting a beverage at will including an indicator-plate bearing names of beverages and threaded on the selector-shaft, a control-shaft having a threaded connection with the selector-shaft and provided with contact-members, a rotatable operating-shaft provided with a crank-arm and a rotatable connection with the control-shaft, mechanism connected with the cup-supporting frame and crank-arm of the operating-shaft for causing horizontal reciprocation of said frame, a plurality of syrup-cylinders containing syrups corresponding to the names on the indicator-plate, mechanism including syrup-measuring-cups in the cylinders each adapted to be moved by a contact-member during a rotary movement of a control-shaft to permit a movement of syrup to the mixing-receptacle, a cylindrical tank provided with a piston and arranged to receive a liquid under pressure, and devices on the operating-shaft for a control of the movements of said liquid and to permit a flow thereof to said mixing receptacle.

CARL O. CHRISTIANSON.